April 16, 1968 R. W. FRANK 3,378,701
DIRECT COUPLED PULSE TIMING APPARATUS
Filed May 21, 1965
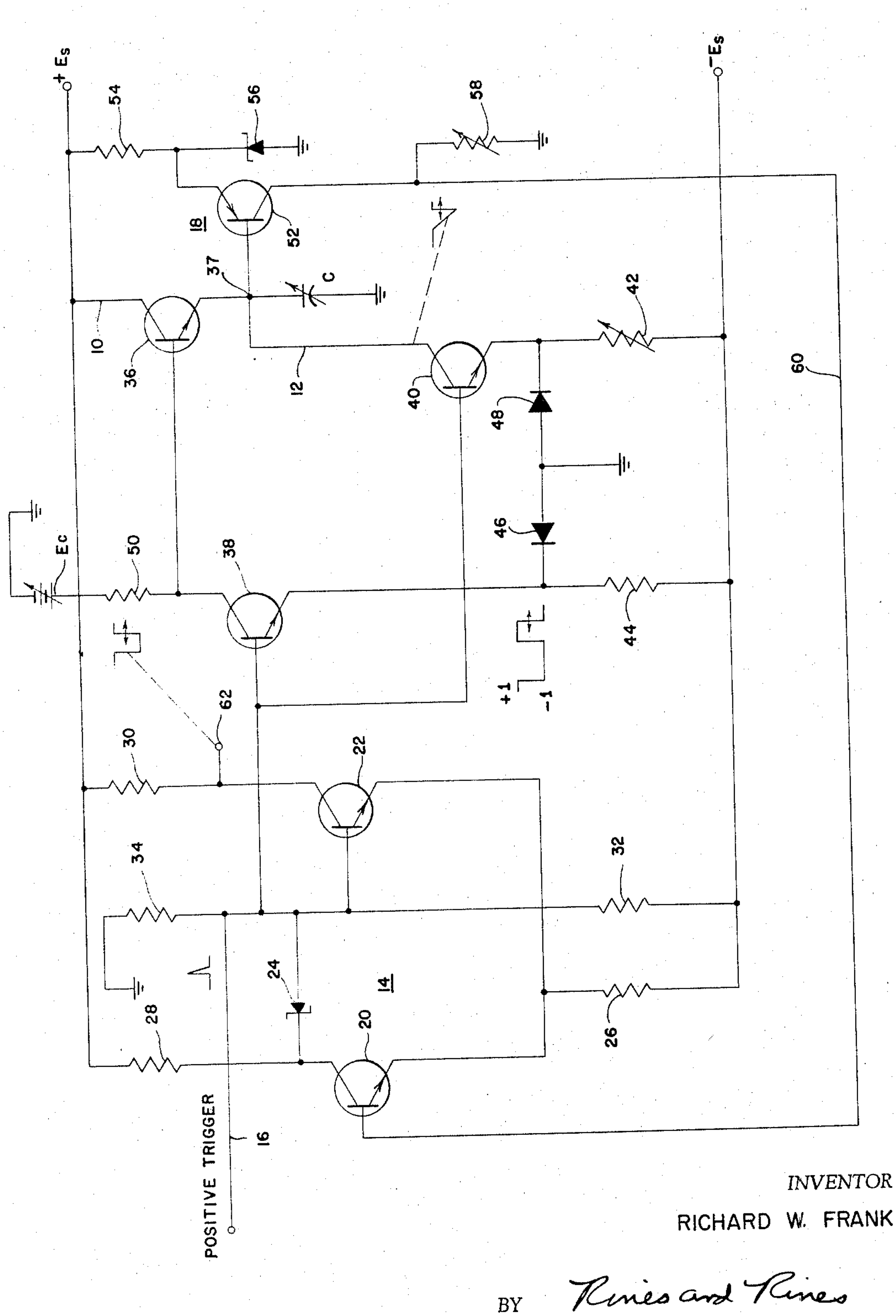
INVENTOR
RICHARD W. FRANK
BY Rines and Rines
ATTORNEYS United States Patent Office 3,378,701
Patented Apr. 16, 1968

3,378,701
DIRECT COUPLED PULSE TIMING APPARATUS

Richard W. Frank, Concord, Mass., assignor to General Radio Company, Concord, Mass., a corporation of Massachusetts Filed May 21, 1965, Ser. No. 457,566
6 Claims. (Cl. 307—265)

ABSTRACT OF THE DISCLOSURE

The present disclosure deals with a direct coupled pulse timing apparatus that, through a novel combination of a ramp generator, bistable control means initiating the ramp generator and terminating the same, and trigger means for setting the control of the bistable control means, obviates the complexity of prior art AC coupled circuits and their suscepibility to "lock-out" and other disadvantages.

The present invention relates to an improved control and timing apparatus, and more particularly, to circuits for producing pulses of precisely controlled duration adjustable over a wide range.

Prior-art timing circuits employing a sweep generator for producing a ramp signal, which commences in response to a triggering signal and terminates when the ramp signal reaches a predetermined amplitude level, employ separate control circuits, such as flip-flop, for the ramp generator and amplitude comparators to respond to the amplitude of the ramp. Apart from the undue complexity of such circuits, the inherent use of cross-coupling or AC coupling circuits has necessitated substantial recovery time. Prior apparatus of this type have been susceptible to "lock out" due to missing a reset pulse.

It is accordingly a principal object of the present invention to provide new and improved apparatus which avoids the above-mentioned and other deficiencies that have characterized prior apparatus and yet retains the advantageous low noise and highly linear time-versus-voltage characteristics of ramp-type apparatus.

More specifically, it is an object of the present invention to provide apparatus for timing, or other applications, utilizing a simple circuit that minimizes the number of required components, but which nevertheless is capable of reliable, accurate, and high-speed performance.

Yet another object of the invention is to provide apparatus for producing pulses, the duration of which may be precisely determined and may be varied over an unusually wide range while maintaining linearity of control.

The above and other objects, advantages, and features of the invention and the manner in which the same are accomplished will become more readily apparent upon consideration of the following detailed description, and will be more particularly delineated in the appended claims. The invention will now be described in conjunction with the accompanying drawing, in which the single figure is a schematic diagram of an exemplary form of timing circuit construction in accordance with a preferred embodiment of the invention.

Referring to the drawing, a circuit of the invention comprises, in general, means such as capacitance C for storing electrical energy, a charging circuit 10 for charging the storage means, a discharging circuit 12 for discharging the storage means, a bistable control circuit 14 for controlling the operation of the charging and discharging circuits, a signal input circuit 16 for setting the bistable control circuit, and an amplitude comparison circuit 18 for resetting the bistable control circuit. In the form shown, the bistable control circuit 14 comprises a pair of alternately conductive solid-state switches, illustrated as transistors 20 and 22. The collector of transistor 20 is connected to the base of transistor 22 by a solid-state voltage regulating rectifier 24, which may be a Zener diode, though other voltage-translating means may be employed. The emitters of transistors 20 and 22 are connected through a resistor 26 to a source of negative potential $-E_s$, while the collectors of transistors 20 and 22 are connected through resistors 28 and 30, respectively, to a source of positive potential $+E_s$. The base of transistor 22 is also connected to the signal input circuit 16 through a resistor 32 to the negative supply, and through a resistor 34 to ground (which may be actual earth or chassis or other reference potential). The bistable control circuit is illustrated as a current-mode version of the Schmitt circuit. The gain-bandwidth characteristics of the transistors control the circuit-switching speed.

In the illustrative embodiment, the storage means C is a capacitor having one side connected to ground and the other side connected to the charging circuit 10 and the discharging circuit 12. The charging circuit includes a solid-state switch or gate illustrated by transistor 36, having its emitter connected to the ungrounded terminal 37 of capacitor C and its collector connected to the source of positive potential. The base of transistor 36 is connected to the collector of a transistor 38, which constitutes another solid-state switch, and the base of transistor 38, in turn, is connected back to the base of transistor 22.

The discharging circuit 12 includes another solid-state switch or gate, shown as transistor 40, which has its collector connected to terminal 37 and its emitter connected through a resistor 42 to the negative supply. The emitter of transistor 38 is similarly connected to the negative supply through a resistor 44, and the emitters of transistors 38 and 40 are also connected to ground through diodes 46 and 48, respectively, which maintain relatively constant current in resistors 42 and 44. The base of transistor 40 is connected to the bases of both transistors 22 and 38, and switches 22 and 38 will be turned on together by the switching circuit 14. The discharging circuit is a constant current circuit providing a substantially linear decrease (hereinafter referred to as linear) of the potential upon the capacitor C when transistor 40 is rendered conductive, the discharge current being controlled by the value of resistor 42. The base of transistor 36 in the charging circuit is connected through resistor 50 to a source of potential $E_c$, which may be variable and which controls the level of the potential to which the capacitor is charged. Capacitor C and transistors 36, 38 and 40 and the associated circuitry thus constitute a sweep or ramp voltage generator controlled by and direct coupled to the bistable circuit 14.

The amplitude comparison means comprises another solid-state switch, transistor 52, for determining when the capacitor C discharges to a voltage level equal to a reference potential $e_r$. For this purpose the base of transistor 52 is connected to terminal 37, and the emitter is connected to the junction of a resistor 54 and a solid-state voltage regulating rectifier 56, such as a Zener diode. The other side of resistor 54 is connected to the positive supply, and the voltage-regulating diode 56 is connected to ground. The collector of transistor 52, in turn, is connected through a resistor 58 to ground and through a feedback path 60 to the base of transistor 20 in the bistable circuit. In the form shown, transistor 52 is a PNP type and the remaining transistors may be of the NPN type. For purposes of illustration, the positive and negative supplies may be assumed to be 28 volts positive and negative with respect to ground and the supply $E_c$ may be variable between 6 and 18 volts positive with respect to ground. Other typical voltages will be specified.

The operation of the circuit is as follows: With the circuit in its quiescent condition, transistor 20 is ON and transistor 22 is OFF. The base of transistor 20 is then near to ground potential. The collector current of transistor 20 in resistor 28 produces a drop which, translated by Zener diode 24, sets the base voltage of transistor 22 at approximately −1 volt, holding transistor 22 stably OFF. Transistors 38 and 40 will, therefore, be OFF and transistor 36 ON. Condenser C will charge from the positive supply through transistor 36 until the voltage at terminal 37 reaches approximately $E_c$.

If a positive pulse is applied to the base of transistor 22 from the input circuit 16, transistor 22 will turn ON and transistor 20 will regeneratively turn OFF. The Schmitt circuit action will now hold transistor 22 ON with its base at approximately +1 volt. With the voltage across resistor 34 now at +1 volt, transistors 38 and 40 will be turned ON. The drop across resistor 50 due to the collector current of transistor 38 ensures that transistor 36 is OFF. Current source 40 is now ON and begins to discharge capacitor C. The discharge current is established by the negative power supply connected to the emitter of transistor 40. This constant current causes the voltage at terminal 37 to decrease linearly until transistor 52 turns ON at the reference voltage $e_r$. When transistor 52 turns ON, a positive voltage is applied to the base of transistor 20 through the feedback circuit 60, turning transistor 20 ON, and turns transistor 22 OFF; returning the Schmitt circuit to the original condition of operation, above discussed. Transistors 38 and 40 will now again turn OFF, and capacitor C will recharge as rapidly as transistor 36 can supply current. The capacitor will charge to a voltage level at which the emitter voltage of transistor 36 is substantially equal to the voltage $E_c$ applied to the base. The circuit is again ready for a trigger.

For a given capacitor C and resistor 42, the duration of the ramp generated during the discharge of the capacitor is determined by the potential $E_c$, which sets the level of the potential across the capacitor when the capacitor is fully charged. The potential of source $E_c$ may be adjusted to provide fine variation of the duration, coarse variation being obtained over a wide range by varying capacitor C and resistor 42, which may be continuously adjustable or selectively replaceable. A rectangular output pulse of duration corresponding to the ramp may be taken, for example, from the collector of transistor 22, an output terminal being indicated at 62. Linear control of pulse duration with voltage may be maintained well below 5 ns., and a range of 5 ns. to 1 sec. is representative with good silicon planar transistors. Because there are no cross-coupling or AC coupling circuits, the recovery time is very short, being established solely in the time required to reset the voltage on C to $E_c$. In other terms, the device C is the only energy storage device in the circuit.

While a preferred embodiment of the invention has been shown and described, wherein, in effect, a simplified single flip-flop amplitude comparison and control circuit is provided, it will be apparent to those skilled in the art that changes can be made in this embodiment without departing from the principles and spirit of the invention, the scope of which is defined in the appended claims. For example, in some applications the bistable circuit may be triggered by a negative pulse applied to the base of transistor 20 with appropriate transistors accordingly employed. Accordingly, the foregoing embodiment is to be considered illustrative, rather than restrictive of the invention, and those modifications which come within the scope, meaning and range of equivalency of the claims are to be considered as included therein.

What is claimed is:

1. A solid-state timing apparatus comprising a bistable control circuit having first and second alternately conductive solid-state switches, a storage capacitor, a charging circuit for said capacitor including a third solid-state switch, a constant current discharging circuit for said capacitor including a fourth solid-state switch, means responsive to said bistable circuit for rendering said third and fourth switches conductive alternately, and amplitude comparison means including a fifth solid-state switch for determining when said capacitor has discharged to a predetermined reference level and for thereupon feeding back a signal along a direct-current path to reset said bistable circuit.

2. The apparatus of claim 1, said bistable control circuit comprising a voltage regulating solid-state rectifier interconnecting the output of said first switch and the input of said second switch.

3. The apparatus of claim 1, wherein said amplitude comparison means comprises a voltage regulating solid-state rectifier for applying a reference potential thereto.

4. The apparatus of claim 1, said means for rendering said third and fourth solid-state switches conductive alternately comprising another solid-state switch.

5. Apparatus having, in combination, a bistable switching circuit, means for applying a trigger pulse to the switching circuit to cause it to change its state, a capacitor, means for charging said capacitor including a normally conductive switching stage, means for connecting the switching circuit to the switching stage to render the switching stage non-conductive and to enable the discharge of the capacitor, a constant current discharge circuit operable upon the rendering non-conductive of the switching stage for enabling the capacitor to discharge therethrough, a comparator amplifier, to which a reference voltage is applied, together with the voltage of the capacitor during discharge to produce an output signal when the capcitor has discharged to the level of the reference voltage, and means for thereupon feeding the output signal back to the switching circuit to re-establish the initial state thereof.

6. Apparatus as claimed in claim 5 and in which the feeding-back means is directly coupled to the said switching circuit.

References Cited

UNITED STATES PATENTS

| | | | |
|---|---|---|---|
| 2,596,167 | 5/1952 | Philpott | 328—185 |
| 2,824,962 | 2/1958 | Wise | 328—185 X |
| 3,049,625 | 8/1962 | Brockman | 307—88.5 |
| 3,053,996 | 9/1962 | Stefanov | 307—88.5 |
| 3,073,972 | 1/1963 | Jenkins | 307—88.5 |
| 3,105,939 | 10/1963 | Onno et al. | 328—58 X |
| 3,225,221 | 12/1965 | Scott | 307—88.5 |
| 3,297,883 | 1/1967 | Schulmeyer | 307—88.5 |
| 3,303,359 | 2/1967 | Brisay | 307—88.5 |

ARTHUR GAUSS, *Primary Examiner.*

S. D. MILLER, JR., *Assistant Examiner.*